United States Patent
Gorman et al.

(10) Patent No.: US 9,608,853 B1
(45) Date of Patent: Mar. 28, 2017

(54) IP ORIGINATION POINT AND METHOD TO DETERMINE TRANSCODING IN PACKET COMMUNICATIONS

(71) Applicant: Sprint Communications Company L.P., Overland Park, KS (US)

(72) Inventors: Pierce Andrew Gorman, Lee's Summit, MO (US); Siddharth Oroskar, Overland Park, KS (US); Robert E. Geis, Lenexa, KS (US); Hal S. Beech, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 700 days.

(21) Appl. No.: 13/969,908

(22) Filed: Aug. 19, 2013

(51) Int. Cl.
*H04L 29/06* (2006.01)
*H04W 88/18* (2009.01)

(52) U.S. Cl.
CPC ....... *H04L 29/0604* (2013.01); *H04W 88/181* (2013.01)

(58) Field of Classification Search
None
See application file for complete search history.

(56) References Cited

U.S. PATENT DOCUMENTS

| | | |
|---|---|---|
| 6,172,974 B1 | 1/2001 | Tseng et al. |
| 7,760,709 B2 | 7/2010 | Koistinen |
| 7,933,258 B2 | 4/2011 | Farber et al. |
| 2006/0195886 A1 | 8/2006 | Ashley |

*Primary Examiner* — Ayaz Sheikh
*Assistant Examiner* — Sori Aga

(57) ABSTRACT

An IP origination point and method to determine transcoding in packet communications are provided. The IP origination point in one example embodiment includes a communication interface configured to exchange packet communications with a media transport path, a storage system configured to store an origination communication, payload data for the origination communication, integrity information for the origination communication that is configured to be modified by one or more transcoding operations, and returned integrity information that may have been modified by the one or more transcoding operations. A processing system generates and transmits the origination communication into the media transport path, compares the returned integrity information to the integrity information, and determines a transcoding level of transcoding that occurred in the media transport path if the returned integrity information is not equal to the sent integrity information.

20 Claims, 6 Drawing Sheets

IP ORIGINATION POINT AND METHOD TO DETERMINE TRANSCODING IN PACKET COMMUNICATIONS

TECHNICAL FIELD

Aspects of the disclosure are related to the field of communications, and in particular, an IP origination point and method to determine transcoding in packet communications.

TECHNICAL BACKGROUND

Packet communication networks are experiencing greater and greater use. In addition, packet communication systems are being used for more and more wireless communications, such as in cellular phone systems, wherein audio and non-audio packet data may be transmitted over a combination of wired and wireless communication links.

Communication networks may include transcoders that modify packets passing through the network, such as by performing compression and de-compression on the packets, for example. The transcoding may be performed in order to reduce the amount of data to be transferred.

The transcoding may undesirably affect the packets. For example, the transcoding may be performed on audio data, such as VOIP packets. Wide Band (WB) High-Definition (HD) voice compression/decompression (i.e., codec) algorithms often require more kilobits-per-second (kbps) throughput than Narrow Band (NB) voice packets. The throughput required of WB codecs can comprise an undesirable and wasteful consumption of spectrum on a 3G or 4G Radio Access Network (RAN) if the end-to-end voice media path uses Narrow Band (NB) transcoding anywhere in the path. The WB codecs are wasteful if the packets are transcoded to NB because there is little or no perceptual benefit to the audio experience.

Unfortunately, because SIP may be used to initiate a HD voice call setup, and because of the hop-by-hop nature of SIP voice call signaling through a switched network using transcoding media gateways, it may be impossible to identify beforehand that transcoding will occur in a given call's media path.

One drawback of transcoding is that no indication of transcoding may be given to either the origination point or the destination point of a packet communication session. The origination point and the destination point may not know the level or severity of transcoding that has been performed on the communication session. Consequently, the origination point will not be able to initiate a communication session according to an expected transcoding.

Another drawback is that multiple transcoding processes may be performed on packets as they are transferred between points. Consequently, the origination point will not be able to configure the transmission of packets according to a narrowest expected transcoding.

OVERVIEW

Systems and methods to determine transcoding in packet communications are provided herein. In one example, an IP origination point to determine transcoding in packet communications includes a communication interface configured to exchange packet communications with a media transport path, a storage system configured to store an origination communication, payload data for the origination communication, integrity information for the origination communication that is configured to be modified by one or more transcoding operations, and returned integrity information that may have been modified by one or more transcoding operations, and a processing system coupled to the communication interface and the storage system, with the processing system configured to generate and transmit the origination communication into the media transport path, compare the returned integrity information to the integrity information, and determine a transcoding level of transcoding that occurred in the media transport path if the returned integrity information is not equal to the integrity information.

In an example of a method to determine transcoding in packet communications, the method includes generating an origination communication in an IP origination point and transmitting the origination communication into a media transport path, with the origination communication including payload data and integrity information that is configured to be modified by one or more transcoding operations, the IP origination point comparing a returned integrity information to the integrity information, wherein the returned integrity information may have been modified by the one or more transcoding operations, and the IP origination point determining a transcoding level of transcoding that occurred in the media transport path if the returned integrity information is not equal to the sent integrity information.

In another example of a method to determine transcoding in packet communications, the method includes generating an origination communication in an IP origination point and transmitting the origination communication into a media transport path, with the origination communication including payload data and integrity information that is configured to be modified by one or more transcoding operations, the IP origination point comparing a returned integrity information to the integrity information, wherein the returned integrity information may have been modified by the one or more transcoding operations, the IP origination point determining a transcoding level of transcoding that occurred in the media transport path if the returned integrity information is not equal to the sent integrity information, and the IP origination point storing the transcoding level and transcoding data of the communication session.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
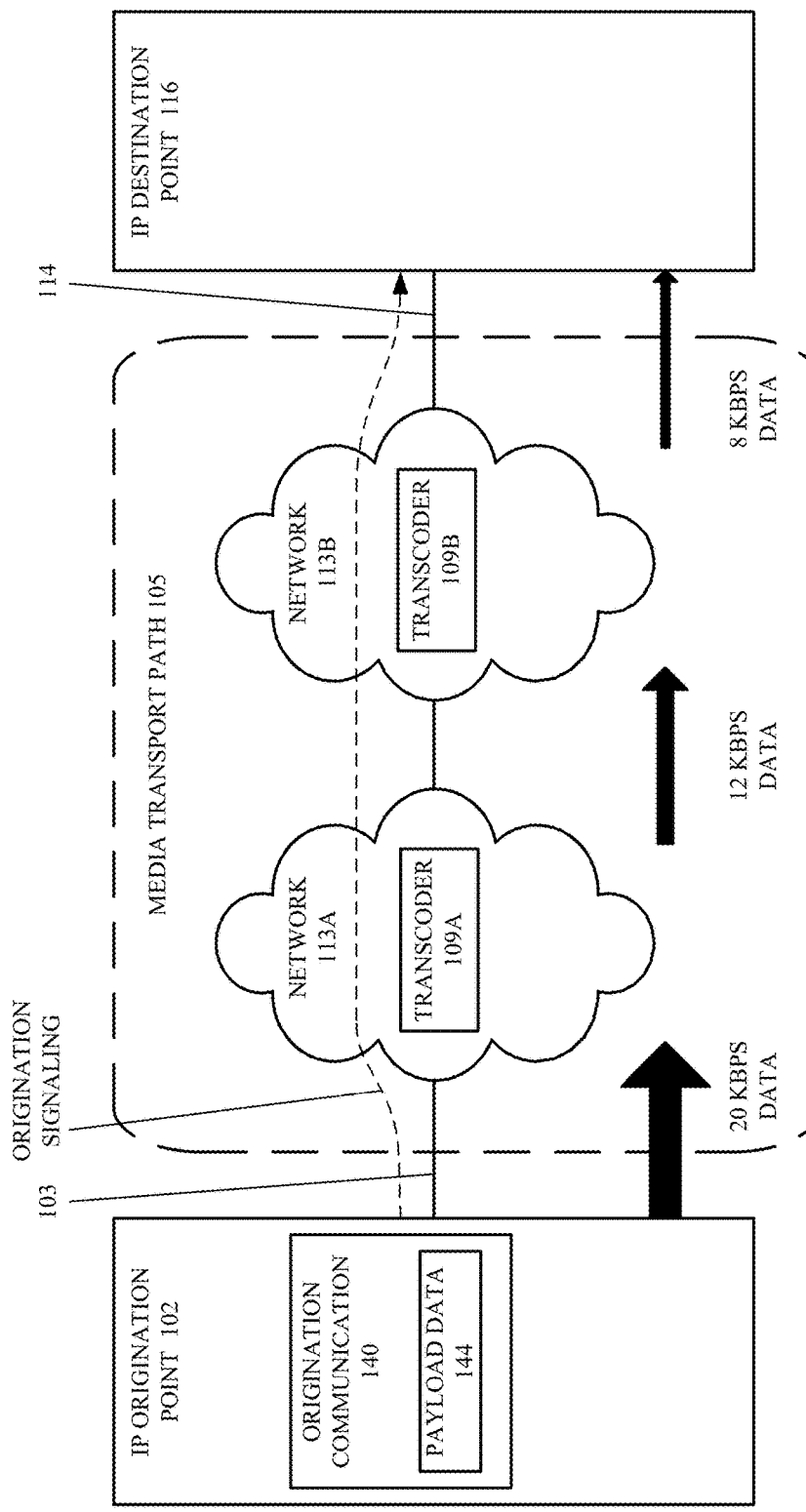
FIG. 1 shows an exemplary packet communication network.

FIG. 1 shows an exemplary packet communication network. The packet communication network 100 includes an IP origination point 102, a media transport path 105, and an IP destination point 116, for example. The media transport path 105 is capable of packet communications. The media transport path 105 may include one or more networks 113, such as the first and second networks 113A and 113B, shown. The IP origination point 102 initiates a communication session with the IP destination point 116, wherein the communication session is conducted through the media transport path 105.

The IP origination point 102 is communicatively linked to the media transport path 105 by a communication link 103 and the IP destination point 116 is communicatively linked to the media transport path 105 by a communication link 114. The communication links 103 and 114 comprise suitable wired or wireless links.

The figure shows an origination communication 140 generated by an origination procedure in the IP origination point 102. The origination communication 140 includes payload data 144 and can comprise a packet origination communication that the IP origination point 102 uses for establishing communications with the IP destination point 116. If the IP origination point 102 is communicating with the media transport path 105 via the Session Initiation Protocol (SIP), then the origination communication 140 may comprise a SIP invite, for example. However, it should be understood that other communication protocols and origination communications are contemplated and are within the scope of the description and claims.

The IP origination point 102 and the IP destination point 116 communicate through the media transport path 105 without knowing the number, type, or details of the one or more networks 113. The IP origination point 102 and the IP destination point 116 may not be aware of the internal details of the one or more networks 113. The IP origination point 102 and the IP destination point 116 may not be aware of how the one or more networks change the packets that are transferred between the IP origination point 102 and the IP destination point 116.

The two networks 113A and 113B include corresponding transcoders 109A and 109B. A transcoder 109 modifies the packets passing through the media transport path 105, such as by performing compression and de-compression on the packets, for example. Other transcoding types may be included and are within the scope of the description and claims.

The transcoding may undesirably affect the packets. For example, the transcoding may be performed on audio data sent through the media transport path 105, such as VOIP packets, for example. The transcoding may be performed in order to reduce the amount of data to be transferred through the media transport path 105.

Wide Band (WB) High-Definition (HD) voice compression/decompression (i.e., codec) algorithms often require more kilobits-per-second (kbps) throughput. The throughput required of WB codecs can comprise an undesirable and wasteful consumption of spectrum on a 3G or 4G Radio Access Network (RAN) if the end-to-end voice media path uses Narrow Band (NB) transcoding anywhere in the path. The WB codecs are wasteful if they are transcoded to NB because there is little or no perceptual benefit to the audio experience. The RAN spectrum can be usefully conserved by negotiating end-to-end and subsequently employing a less-consumptive codec where it is recognized that a HD voice signal cannot be transported in an unchanged condition. Unfortunately, because SIP may be used to initiate a HD voice call setup, and because of the hop-by-hop nature of SIP voice call signaling through a switched network using transcoding media gateways, it may be impossible to identify beforehand that transcoding will occur in a given call's media path.

In this example, the second transcoder 109B comprises a narrowband (NB) transcoder that performs narrowband transcoding on packets passing through the second network 113B. For example, the NB transcoding may have an 8 kbps bandwidth. In contrast, the first transcoder 109A comprises a wideband (WB) transcoder that performs wideband transcoding on packets passing through the first network 113A. For example, the WB transcoding may have a 12 kbps bandwidth. These bandwidths are examples only and are not limiting and are not authoritative on whether a transcoding is NB or WB. As a result, packets sent from the IP origination point 102 to the IP destination point 116 (and vice versa) may have two transcoding operations performed on them.

However, the presence of the NB transcoding makes the WB transcoding unnecessary. Further, multiple transcoding may distort and/or degrade the packet data. Further, providing high definition (HD) audio packets to the media transport path 105, such as audio packet data of a bandwidth higher than the NB transcoding (or higher than the WB transcoding) is pointless and results in a large loss of audio quality and resolution. In the prior art, if HD audio packets are provided to the media transport path 105, the audio quality and resolution may be unavoidably degraded by the transcoding.

A drawback is that the media transport path 105 may not give any indication of transcoding to either the IP origination point 102 or the IP destination point 116. The IP origination point 102 and the IP destination point 116 may not know if transcoding has been performed on the communication session. The IP origination point 102 and the IP destination point 116 may not know what level or severity of transcoding has been performed on the communication session.

Another drawback is that multiple transcoding processes may be performed on packets as they are transferred between the IP origination point 102 and the IP destination point 116, such as the transcoding performed by the transcoders 109A and 109B, as shown in the figure. Consequently, the IP origination point 102 and the IP destination point 116 in the prior art may not be able to configure the transmission of packets according to a narrowest expected transcoding.

Figure 2:
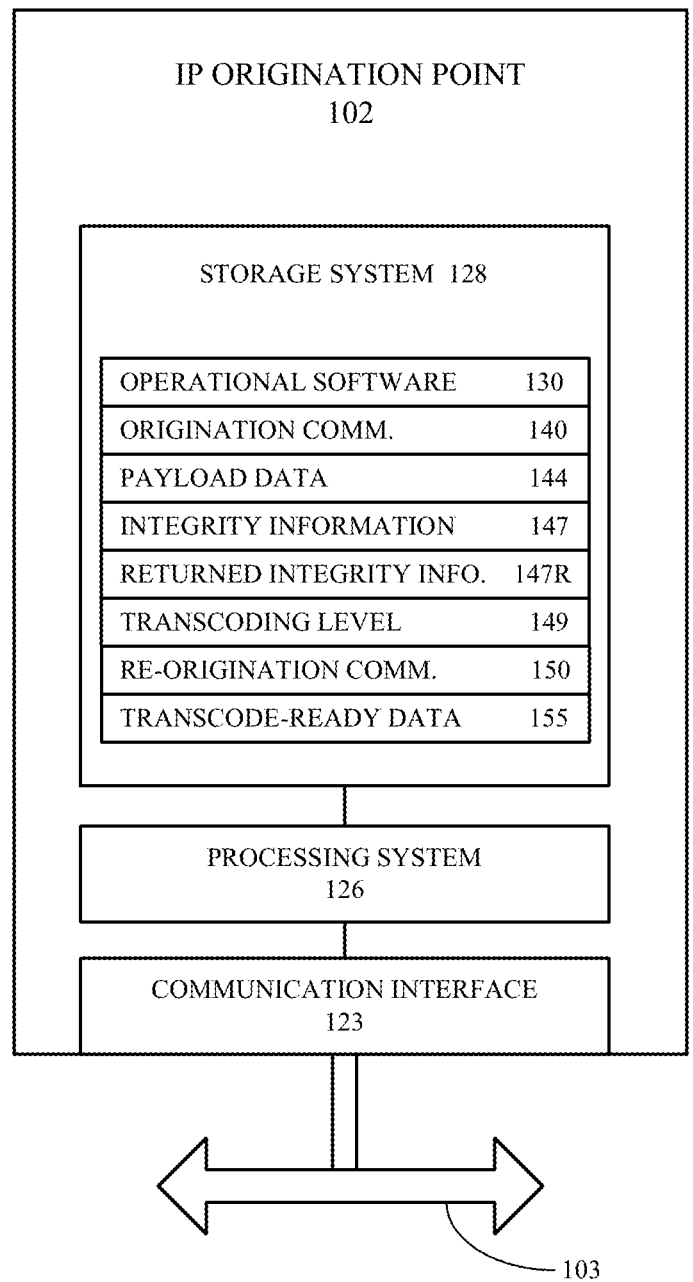
FIG. 2 shows an exemplary IP origination point within the packet communication network.

FIG. 2 shows an exemplary IP origination point 102 within the packet communication network 100. The IP origination point 102 in the example shown includes a communication interface 123, a storage system 128, and a processing system 126. The IP origination point 102 is configured to exchange packet communications in a communication session and over a communication system 100. The communication system 100 comprises the IP origination point 102, the IP destination point 116, and the media transport path 105, for example (see FIG. 3).

The IP origination point 102 exchanges packet communications using one or more packet communication protocols, such as TCP/IP, ATM, GPRS, X.25, Frame relay, SIP, and RTP. It should be understood that the above is not an exhaustive listing, and other packet communication protocols are contemplated and are within the scope of the description and claims.

The communication interface 123 is configured to exchange packet communications. The communication interface 123 is coupled to a communication link 103. The processing system 126 is coupled to the communication interface 123 and the storage system 128. The storage system 128 comprises a computer readable storage media readable by the processing system 126 and storing the software 130.

The storage system 128 in the example shown stores an operational software 130, an origination communication 140, payload data 144, integrity information 147, returned integrity information 147R, a transcoding level 149, a re-origination communication 150, and transcode-ready data 155. Other data may also be stored in the storage system 128.

The operational software 130 comprises operating instructions that configure the processing system 126, when the operational software 130 is executed by the processing system 126. In one example, the operational software 130, when executed by the processing system 126, directs the IP origination point 102 to generate an origination communication 140 and transmit the origination communication 140 into the media transport path 105, with the origination communication 140 including payload data 144 and integrity information 147 that is configured to be modified by one or more transcoding operations, compare a returned integrity information 147R to the integrity information 147, wherein the returned integrity information 147R may have been modified by the one or more transcoding operations, and determine a transcoding level of transcoding that occurred in the media transport path if the returned integrity information 147R is not equal to the sent integrity information 147.

In another example, the operational software 130, when executed by the processing system 126, directs the IP origination point 102 to generate the origination communication 140 and transmit the origination communication 140 into the media transport path 105, with the origination communication 140 including the payload data 144 and the integrity information 147 that is configured to be modified by one or more transcoding operations, compare a returned integrity information 147R to the integrity information 147, wherein the returned integrity information 147R may have been modified by the one or more transcoding operations, determine a transcoding level of transcoding that occurred in the media transport path 105 if the returned integrity information 147R is not equal to the sent integrity information 147, and store the transcoding level 149 and transcoding data of the communication session.

The origination communication 140 comprises a communication to be sent from the IP origination point 102 to the IP destination point 116. The origination communication 140 may comprise any manner of packets for the relevant packet communication protocol. The origination communication 140 may include the payload data 144 and the integrity information 147, for example.

The payload data 144 may comprise data to be sent as packets from the IP origination point 102 to the IP destination point 116. In some embodiments, the payload data 144 may include audio data packets. The audio data packets may comprise audio of a variety of bandwidths.

The integrity information 147 comprises information configured to be modified by one or more transcoding operations. The integrity information 147 may comprise predetermined information that is added or appended to the payload data 144 (or a portion thereof), such as a cryptographic signature or payload checksum, for example. The integrity information 147 may comprise data added to the middle or an end of the payload data 144, wherein transcoding may be detected by determining whether the transcoding has truncated or deleted any portion of the payload data 144.

Alternatively, the integrity information 147 may comprise predetermined information that is modified into or subtracted from the payload data 144 (or a portion thereof). The integrity information 147 may comprise an informational sequence concealed within the payload data 144. The integrity information 147 may comprise data created by deleting a portion of the payload data 144. The integrity information 147 may comprise a pattern, watermark, or other information that is created within the payload data 144. The integrity information 147 may comprise information added into a silence suppress period of an audio payload.

The integrity information 147 may be configured to be modified wherein the transcoding will truncate the payload data 144 or remove a portion of the payload data 144, fail to truncate or remove any portion of the payload data 144 and/or the integrity information 147, modify any bits of the integrity information 147, or fail to modify any bits of the integrity information 147.

The returned integrity information 147R comprises a copy or new version of the integrity information 147, returned through the media transport path 105. The returned integrity information 147R may have been modified by one or more transcoding operations during transit of the media transport path 105.

It is a drawback of the prior art that the compression/decompression of a transcoding operation may not be under the control of the user or the user device. The compression/decompression may affect the quality of the audio being transported.

A transcoding level of transcoding that occurred in the media transport path 105 may be determined if the returned integrity information 147R is not equal to the integrity information 147. Multiple transcoding operations may be detected using the returned integrity information 147R.

The transcoding level 149 comprises a quantification of the transcoding found and stored for the packet communication session. The transcoding level 149 may comprise one or more found transcoding levels. Alternatively, the transcoding level 149 may comprise a detected narrowest transcoding level. The transcoding level 149 may be used in a current communication session. In addition, the transcoding level 149 may be stored and used in future communication sessions.

The transcoding level 149 may store additional information. For example, the transcoding level 149 may store a transcoding used or not-used status information (i.e., may signal whether the communication session qualifies as a Transcoder Free Operation (TrFO) session). The transcoding level 149 may store a communication session identification information. The transcoding level 149 may store identification information for any of the IP origination point 102, the IP destination point 116, or the media transport path 105.

The IP origination point 102 may store transcoding information in a local storage, in a Centralized Routing Function (CRF) Least-Cost Routing (LCR) database 674 (see FIG. 6), or in any other suitable node, server, database, or system capable of storing and retrieving communication session information.

The storing may include storing any relevant communication session information where transcoding has been detected. The storing may include storing any relevant communication session information where transcoding has not been detected.

The transcode-ready data 155 comprises the payload data 144 modified according to the transcoding level 149. In some embodiments, the transcode-ready data 155 comprises the payload data 144 modified according to a narrowest transcoding level.

The re-origination communication 150 comprises a communication to be sent after the origination communication 140 has been sent and returned. The re-origination communication 150 may comprise any manner of packets for the relevant packet communication protocol. The re-origination communication 150 may include the transcode-ready data 155. The conversion of the payload data 144 to the transcode-ready data 155 may reduce RAN spectrum usage.

Figure 3:
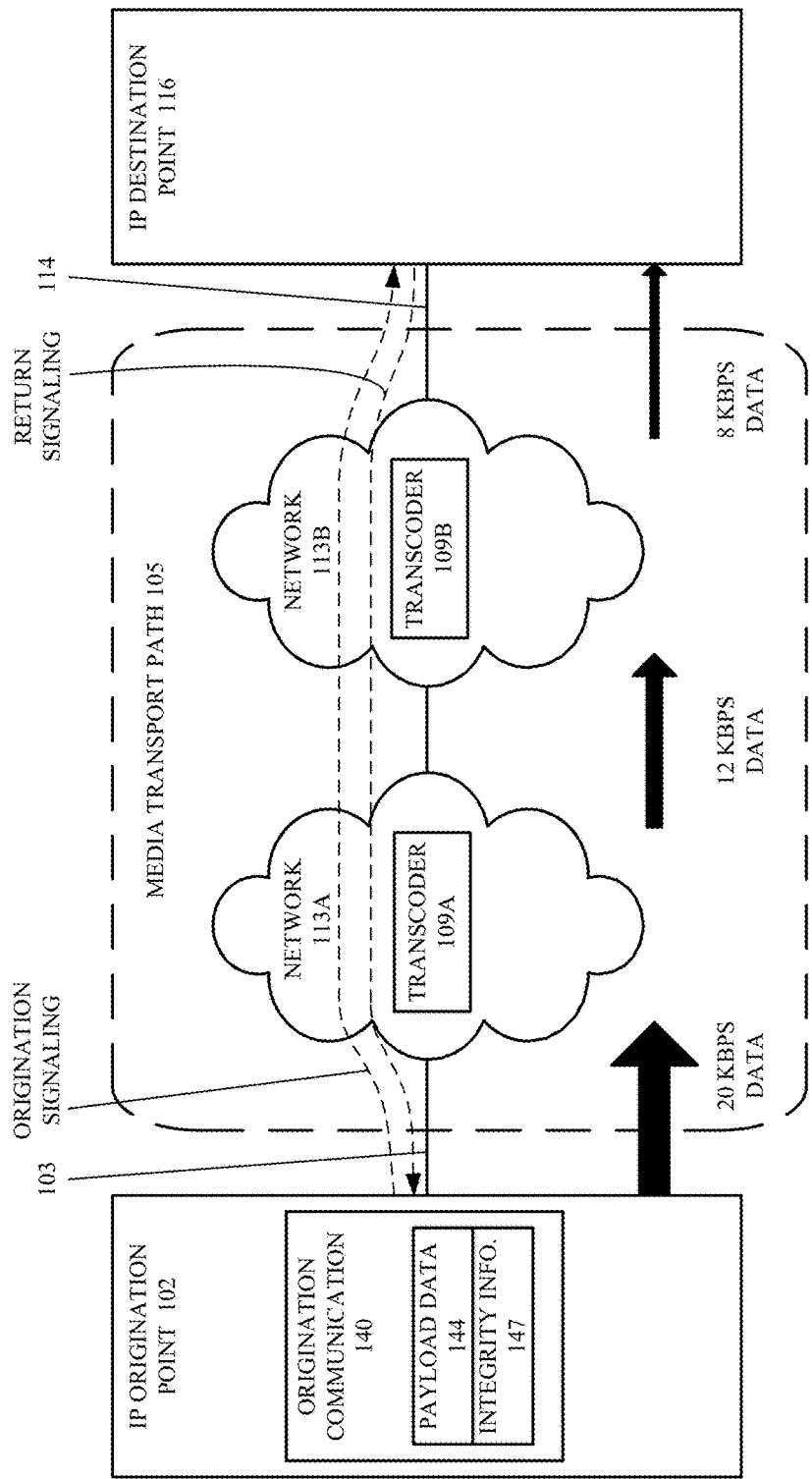
FIG. 3 shows how an origination communication of an origination procedure may traverse a media transport path of a communication system.

FIG. 3 shows how the origination communication 140 of an origination procedure may traverse the media transport path 105 of the communication system 100. In the example in the figure, the origination communication 140 may include the payload data 144 and the integrity information 147. The IP origination point 102 transmits the origination communication 140 over the communication link 103 and into the media transport path 105. The origination communication 140 may have, for example, a 20 kbps data bandwidth when the origination communication 140 is transferred into the media transport path 105.

The origination communication 140 may be relayed through a first network 113A in the media transport path 105. The first network 113A may include a transcoder 109A. The transcoder 109A may operate on and affect the origination communication 140, including the integrity information 147. For example, the transcoder 109A may perform transcoding to reduce the origination communication 140 from a 20 kbps bandwidth to a 12 kbps bandwidth in the example shown.

The origination communication 140 may be relayed through a second network 113B in the media transport path 105. The second network 113B may include a transcoder 109B. The transcoder 109B may operate on and affect the origination communication 140, including the integrity information 147. For example, the transcoder 109B may perform another transcoding, reducing the origination communication 140 from a 12 kbps bandwidth to a 8 kbps bandwidth in the example shown.

The origination communication 140 may be returned to the IP origination point 102 via return signaling. The origination communication 140 may be returned to the IP origination point 102 as part of an acknowledge message, setup message, or other communication initiation message. The returned origination communication 140 includes a returned integrity information 147R.

The returned integrity information 147R can be examined and compared to the sent integrity information 147. The returned integrity information 147R can be examined in order to determine whether transcoding occurred. The returned integrity information 147R can be examined in order to determine a narrowest transcoding if more than one transcoding operation was performed. The returned integrity information 147R can be examined in order to determine how to modify the origination communication 140 in order to establish more efficient communications. The returned integrity information 147R can be examined in order to quantify a transcoding level. The transcoding level may comprise a narrowest transcoding in the case where multiple transcodings have occurred.

Figure 4:
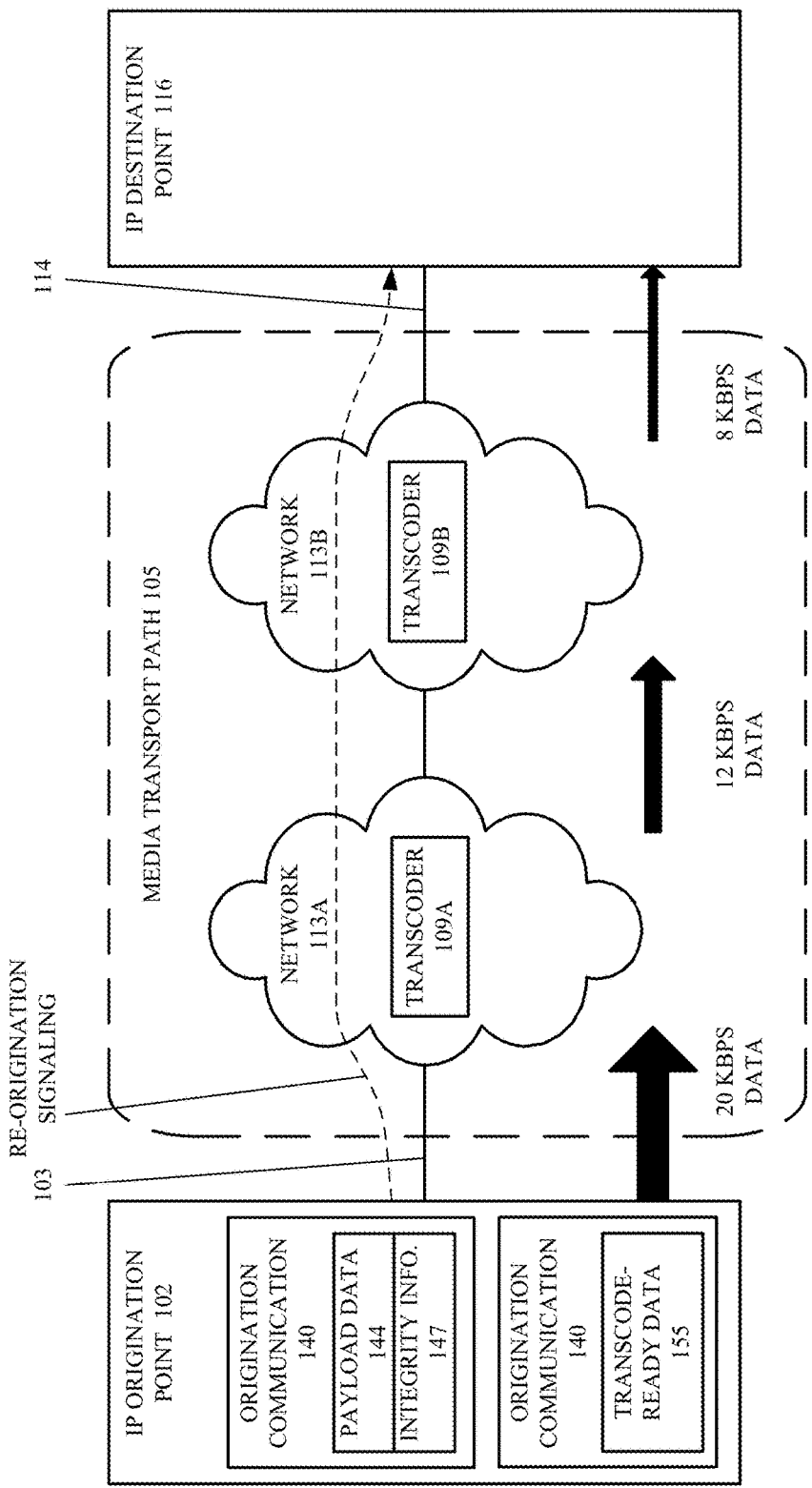
FIG. 4 shows a re-origination procedure that follows the origination procedure of FIG. 3.

FIG. 4 shows a re-origination procedure that follows the origination procedure of FIG. 3. In this figure, the origination communication 140 has been changed to comprise a re-origination communication 150. The re-origination communication 150 may have been changed according to the quantified transcoding level, for example. The payload data 144 now comprises transcode-ready data 155.

In some embodiments, the transcode-ready data 155 may include a data bandwidth that conforms to the narrowest transcoding. For example, the re-origination communication 150 may be transferred into the media transport path 105 at a 8 kbps bandwidth, wherein the second transcoder 190B limits the communication through the media transport path 105 to 8 kbps. Therefore, there is no reason to transfer the re-origination communication 150 into the media transport path 105 at a higher bandwidth. The conversion of the payload data 144 to the transcode-ready data 155 may reduce RAN spectrum usage.

Figure 5:
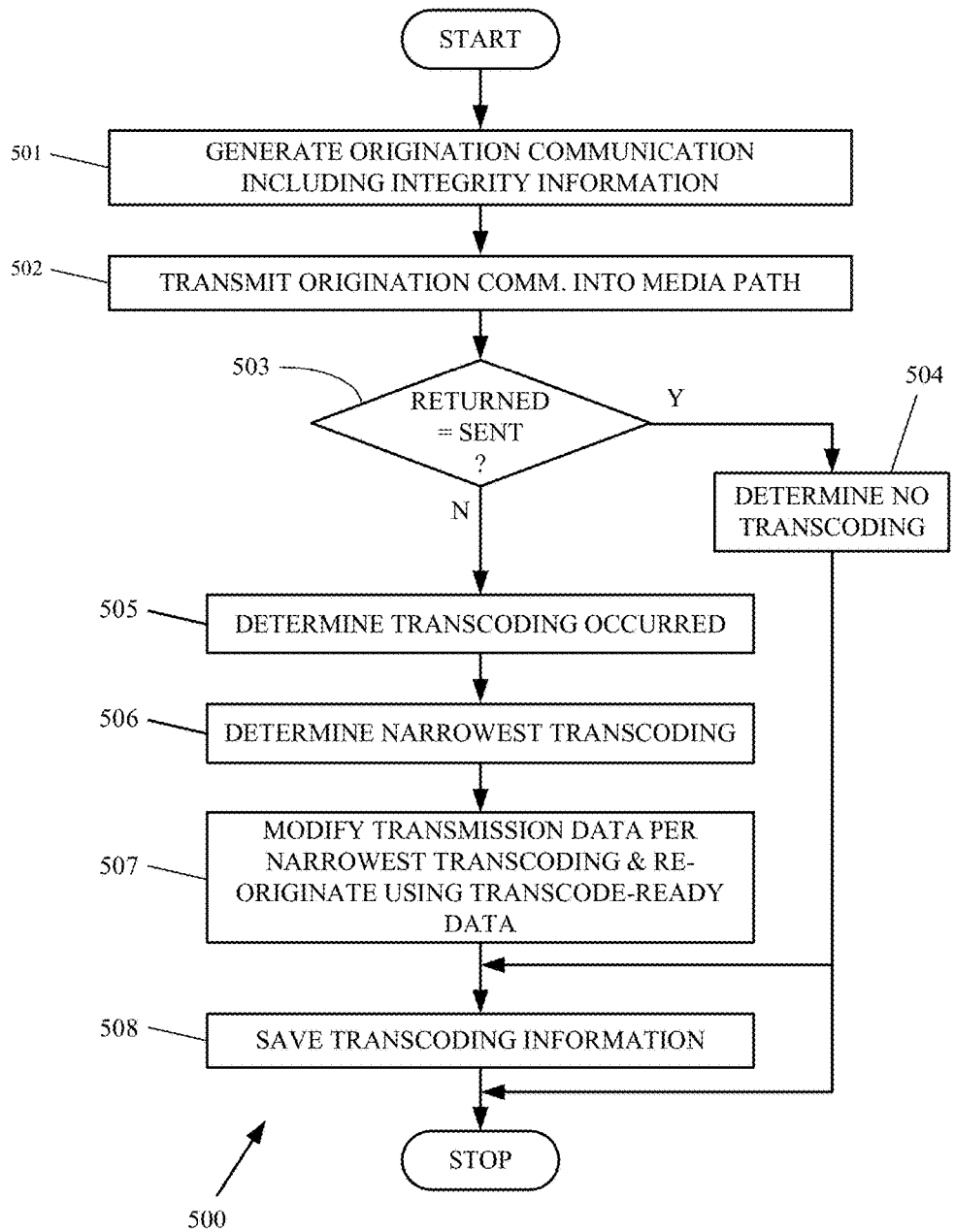
FIG. 5 is a flowchart of an exemplary method of transcoding determination in a packet network.

FIG. 5 is a flowchart 500 of an exemplary method for transcoding determination in a packet network. In step 501, an IP origination point 102 generates an origination communication 140. The origination communication 140 may include payload data 144. The origination communication 140 may also include integrity information 147. The integrity information 147 is configured to be modified by one or more transcoding operations, as previously discussed.

The integrity information 147 may comprise data added or appended to the payload data 144, such as a cryptographic signature or payload checksum, for example. The integrity information 147 may comprise data added to the middle or an end of the payload data 144, wherein transcoding may be detected by determining whether the transcoding has truncated or deleted any portion of the payload data 144. The integrity information 147 may comprise predetermined changes to predetermined bits or a predetermined pattern of bits in the payload data 144, wherein the integrity information 147 is created by modifying the payload data 144 or a portion thereof. The integrity information 147 may comprise data created by deleting a portion of the payload data 144. The integrity information 147 may comprise a pattern, watermark, or other information that is created within the payload data 144. The integrity information 147 may comprise information added into a silence suppress period.

In step 502, the origination communication 140 is transmitted into the media transport path 105 to the IP destination point 116. As a result, the integrity information 147 is also transmitted through the media transport path 105.

In step 503, where a response has been received back in the IP origination point 102 to the origination communication 140, the returned integrity information 147R is compared to the sent integrity information 147. If the returned integrity information 147R is equal to or the same as the sent integrity information 147, then the method branches to step 504. Otherwise, where the returned integrity information 147R is not equal to the sent integrity information 147, the method branches to step 505.

In step 504, where the returned integrity information 147R is determined to be equal to the sent integrity information 147, the IP origination point 102 determines that no transcoding was performed on the returned integrity information 147R. The method may then branch to step 508. Alternatively, the method may branch past step 508.

In step 505, where the returned integrity information 147R is determined to not be equal to the sent integrity information 147, the IP origination point 102 determines that transcoding has occurred. A transcoding indication may be set by the IP origination point 102 for the communication session.

In step 506, the IP origination point 102 determines a narrowest transcoding that was performed on the returned integrity information 147R. For example, if the origination communication 140 was transmitted into the media transport path 105 with a bandwidth of 12 kbps and the returned integrity information 147R exhibits evidence of transcoding at 8 kbps, then the IP origination point 102 may determine that the narrowest transcoding is 8 kbps. There is no reason to send a packet or packets into the media transport path 105 at any higher bandwidth, as excess information will be removed by the 8 kbps transcoding.

In step 507, the IP origination point 102 modifies the payload data 144 and re-originates the communication session. The IP origination point 102 modifies the payload data 144 per the determined narrowest transcoding (i.e., according to the transcoding level 149) to generate transcode-ready data 155. The transcode-ready data 155 may comprise the payload data 144 (such as audio data packets or VOIP audio packets) but modified to be limited to the bandwidth according to the narrowest transcoding. The communication session is therefore re-originated using the transcode-ready data 155, instead of the original payload data 144.

In optional step 509, the IP origination point 102 may store the transcoding information for future use. The IP origination point 102 may store transcoding information including identification information for the communication session (such as a telephone number or SIP address, for example). The IP origination point 102 may store transcoding information including whether or not transcoding was detected. The IP origination point 102 may store transcoding information including the narrowest transcoding found. The IP origination point 102 may store transcoding information including all transcodings found.

The IP origination point 102 may store transcoding information in a local storage, in a Centralized Routing Function (CRF) Least-Cost Routing (LCR) database 674 (see FIG. 6), or in any other suitable node, server, database, or system capable of storing and retrieving communication session information.

The storing may include storing any relevant communication session information where transcoding has been detected. The storing may include storing any relevant communication session information where transcoding has not been detected.

Figure 6:
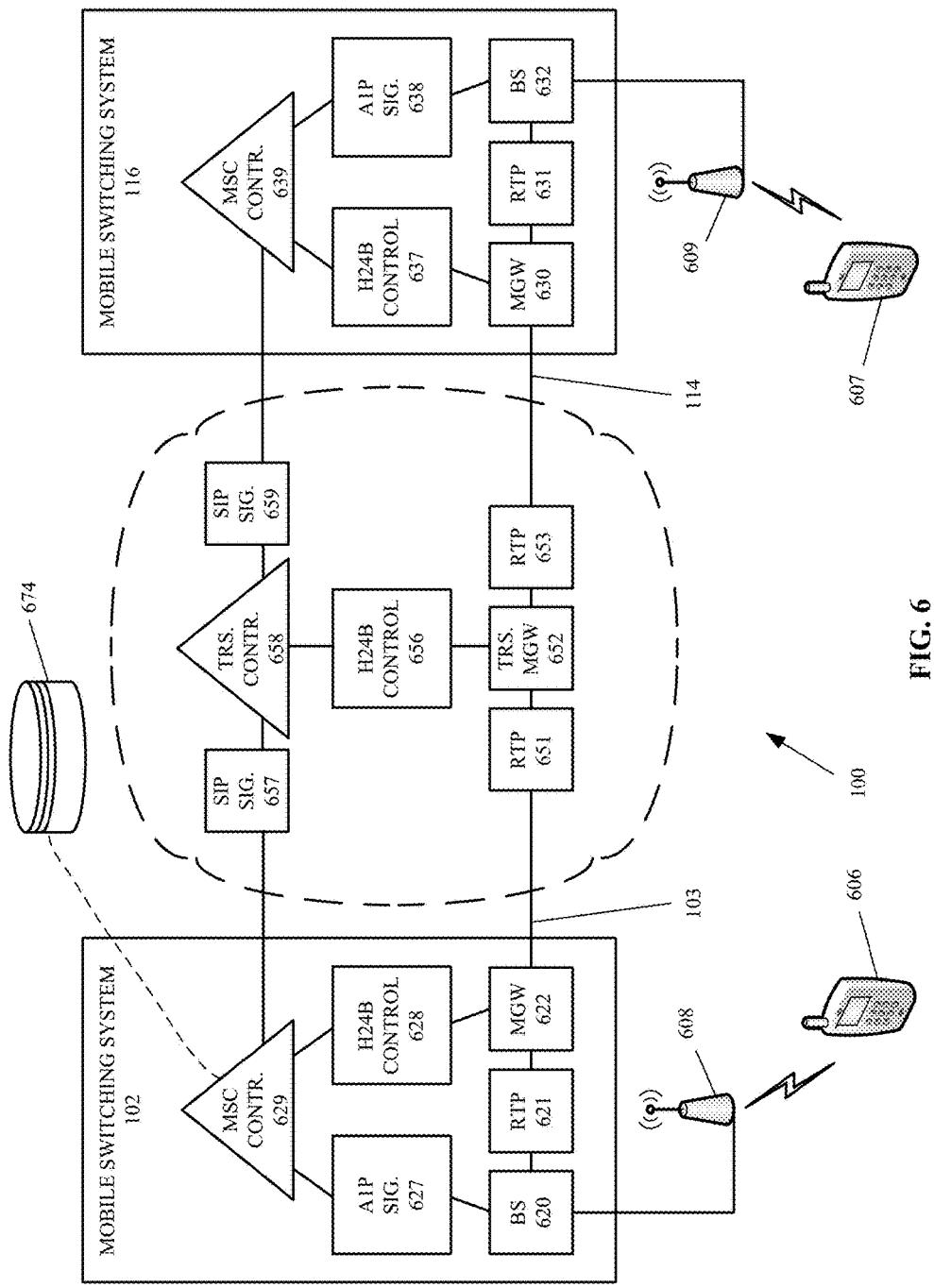
FIG. 6 shows an exemplary packet communication network.

FIG. 6 shows an exemplary packet communication network 100. The packet communication network 100 in the embodiment shown includes an IP origination point 102, a media transport path 105, and an IP destination point 116. The IP origination point 102 and the IP destination point 116 can comprise mobile switching systems in some embodiments.

The IP origination point 102 and the IP destination point 116 may be coupled to corresponding wireless transmission infrastructure 608 and 609. The IP origination point 102 and the IP destination point 116 therefore can wirelessly exchange packet communications between wireless devices, such as the mobile communication devices 606 and 607. Any suitable communication protocol may be employed between the IP origination point 102, the IP destination point 116, and the mobile communication devices 606 and 607.

The IP origination point 102 and the IP destination point 116 in some embodiments include a data transport path comprising base stations 620 and 630 (coupled to the corresponding transmission components 608 and 609), Real-time Transport Protocol (RTP) transmission media 621 and 631, and media gateways 622 and 632. Any suitable data transport protocol or communication protocol may be employed in the data transport path.

The IP origination point 102 and the IP destination point 116 in some embodiments include a signaling path comprising A1P signaling components 627 and 637, H24B control components 628 and 638, and Mobile Switching Center (MSC) controllers 629 and 639. Signaling can be exchanged between the IP origination point 102 and/or the IP destination point 116 and the media transport path 105 via the signaling path. Any suitable signaling protocol or communication protocol may be employed.

The media transport path 105 in the example shown includes a data transport path comprising RTP media components 651 and 653 and a transit media gateway 652. The transit media gateway 652 interfaces between the RTP media components 651 and 653, wherein packet data is transported by the data transport path.

The media transport path 105 in the example shown includes a signaling path comprising SIP signaling components 567 and 659 and a transit controller 658. The transit controller 658 interfaces between the SIP signaling components 657 and 659, wherein signaling is relayed between the IP origination point 102 and the IP destination point 116.

The IP origination point 102 may be configured to communicate with a database 674. The IP origination point 102 may be configured to store and recall transcoding information in the database 674. The IP origination point 102 can consult the database 674 and obtain transcoding information for a communication session. The IP origination point 102 can store transcoding information in the database 674. The database 674 can store, for a communication session, 1) an indication of presence or non-presence of transcoding in the communication session, 2) detected transcoding types, including transcoding levels, 3) a narrowest detected transcoding, and 4) identification information for the communication session and/or for the IP origination point 102 and/or the media transport path 105.

The media transport path 105 may further include an H24B controller 656. The H24B controller 656 may be coupled to the transit media gateway 652 and to the transit controller 658, as is shown in the figure. In operation, the H24B controller 656 may regulate the exchange of signaling in the signaling path and may regulate the data transport in the data transport path.

The IP origination point 102 and the IP destination point 116 can comprise any manner of wired or wireless communication devices. The IP origination point 102 and the IP destination point 116 can comprise any manner of devices capable of packet communication, including packet communications such as voice-over-IP (VOIP), for example. The IP origination point 102 and the IP destination point 116 may comprise wireless communication systems or infrastructure, such as a Mobile Switching System (MSS), a Mobile Switching Center (MSC), a Base Station (BS), or a Base Transceiver Station (BTS). Alternatively, the IP origination point 102 and the IP destination point 116 may comprise wireless user equipment, such as mobile communication devices (e.g., cellular phones or smart phones), mobile computing devices, or other wireless communication devices. Alternatively, the IP origination point 102 and the IP destination point 116 may comprise wired devices or infrastructure, including servers, routers, gateways, translators, or other wired packet network devices.

The communication interface 123 of the IP origination point 102 may communicate in a wired or wireless fashion over the communication link 103. The communication link 103 may comprise any suitable wired or wireless link.

The processing system 126 can comprise one or more microprocessors and other circuitry that retrieves and executes an operational software 130 stored in the storage system 128. The processing system 126 can be implemented within a single processing device but can also be distributed across multiple processing devices or sub-systems that cooperate in executing program instructions. Examples of the processing system 126 include general purpose central processing units, application specific processors, and logic devices, as well as any other type of processing device, combinations, or variations thereof.

The storage system 128 can include volatile and nonvolatile, removable and non-removable media implemented in any method or technology for storage of information, such as computer readable instructions, data structures, program modules, or other data. The storage system 128 may be independent from or integrated into the processing system 126. Data may be stored in and recalled from the storage system 128.

The mobile communication devices 606 and 607 can comprise any mobile communication devices and protocols that can exchange packet communications, including cellular phones. The mobile communication devices 606 and 607 can perform communication services including voice calls, text messages, data access, or other communication services provided over packet communication networks, such as cellular or wireless packet communication networks. The mobile communication devices 606 and 607 can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof.

The mobile communication devices 606 and 607 may include one or more transceiver portions for communication over one or more wireless links of differing frequency bands. The mobile communication devices 606 and 607 can move among any of the coverage areas associated with the IP origination point 102 or the IP destination point 116 and receive wireless access. The mobile communication devices 606 and 607 can include one or more antennas, transceiver circuitry elements, and communication elements. The transceiver circuitry typically includes amplifiers, filters, modulators, and signal processing circuitry. The mobile communication devices 606 and 607 can also include user interface systems, memory devices, non-transitory computer-readable storage mediums, software, processing circuitry, or some other communication components.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An IP origination point to determine transcoding in packet communications, comprising:

a communication interface configured to exchange packet communications with a media transport path;

a storage system configured to store an origination communication, payload data for the origination communication, integrity information for the origination communication that is configured to be modified by one or more transcoding operations, and returned integrity information that may have been modified by one or more transcoding operations; and a processing system coupled to the communication interface and the storage system, with the processing system configured to generate and transmit the origination communication into the media transport path, compare the returned integrity information to the integrity information, and determine a transcoding level of transcoding that occurred in the media transport path if the returned integrity information is not equal to the integrity information.

2. The IP origination point of claim 1, wherein multiple transcoding operations may be detected using the returned integrity information.

3. The IP origination point of claim 1, with the processing system configured to store the transcoding level in the storage system, with the transcoding level comprising a detected narrowest transcoding.

4. The IP origination point of claim 1, with the processing system being further configured to store the transcoding level in the storage system, generate a transcode-ready data comprising the payload data modified according to the transcoding level, and generate a re-origination communication including the transcode-ready data, wherein the re-origination communication re-originates the communication session using the transcode-ready data.

5. The IP origination point of claim 1, with the IP origination point storing transcoding data of the communication session.

6. The IP origination point of claim 1, with the integrity information comprising predetermined information that is added or appended to the payload data of the origination communication.

7. The IP origination point of claim 1, with the integrity information comprising predetermined information that is modified into or subtracted from the payload data of the origination communication.

8. A method of operating a packet communication network to determine transcoding in packet communications, the method comprising:

generating an origination communication in an IP origination point and transmitting the origination communication into a media transport path, with the origination communication including payload data and integrity information that is configured to be modified by one or more transcoding operations;

the IP origination point comparing a returned integrity information to the integrity information, wherein the returned integrity information may have been modified by the one or more transcoding operations;

the IP origination point determining a transcoding level of transcoding that occurred in the media transport path if the returned integrity information is not equal to the sent integrity information and generating a re-origination communication based on the determined transcoding level; and the IP origination point transmitting the re-origination communication into the media transport path.

9. The method of claim 8, wherein multiple transcoding operations may be detected using the returned integrity information.

10. The method of claim 8, further comprising storing the transcoding level, with the transcoding level comprising a narrowest transcoding.

11. The method of claim 8, further comprising:
storing the transcoding level, with the transcoding level comprising a narrowest transcoding;
generating a transcode-ready data comprising the payload data modified according to the transcoding level; and
generating the re-origination communication including the transcode-ready data, wherein the re-origination communication re-originates the communication session using the transcode-ready data.

12. The method of claim 8, further comprising storing transcoding data of the communication session.

13. The method of claim 8, with the integrity information comprising predetermined information that is added or appended to the payload data of the origination communication.

14. The method of claim 8, with the integrity information comprising predetermined information that is modified into or subtracted from the payload data of the origination communication.

15. A method of operating a packet communication network to determine transcoding in packet communications, the method comprising:
generating an origination communication in an IP origination point and transmitting the origination communication into a media transport path, with the origination communication including payload data and integrity information that is configured to be modified by one or more transcoding operations;
the IP origination point comparing a returned integrity information to the integrity information, wherein the returned integrity information may have been modified by the one or more transcoding operations;
the IP origination point determining a transcoding level of transcoding that occurred in the media transport path if the returned integrity information is not equal to the sent integrity information and generating a re-origination communication based on the determined transcoding level; and
the IP origination point transmitting the re-origination communication into the media transport path.

16. The method of claim 15, wherein multiple transcoding operations may be detected using the returned integrity information.

17. The method of claim 15, with the transcoding level comprising a narrowest transcoding.

18. The method of claim 15, further comprising:
storing the transcoding level and transcoding data of the communication session;
generating a transcode-ready data comprising the payload data modified according to the transcoding level; and
generating the re-origination communication including the transcode-ready data, wherein the re-origination communication re-originates the communication session using the transcode-ready data.

19. The method of claim 15, with the integrity information comprising predetermined information that is added or appended to the payload data of the origination communication.

20. The method of claim 15, with the integrity information comprising predetermined information that is modified into or subtracted from the payload data of the origination communication.

* * * * *